United States Patent
Jerstad et al.

(10) Patent No.: US 10,173,765 B2
(45) Date of Patent: Jan. 8, 2019

(54) PRESSURE BULKHEAD APPARATUS

(71) Applicant: The Boeing Company, Chicago, IL (US)

(72) Inventors: Neil M. Jerstad, Lake Tapps, WA (US); Kyle L. McNamara, Gibbstown, NJ (US); David William Bowen, Deptford, NJ (US); Edward F. Lauser, Jr., Ridley Park, PA (US)

(73) Assignee: THE BOEING COMPANY, Chicago, IL (US)

( * ) Notice: Subject to any disclaimer, the term of this patent is extended or adjusted under 35 U.S.C. 154(b) by 245 days.

(21) Appl. No.: 15/093,226

(22) Filed: Apr. 7, 2016

(65) Prior Publication Data

US 2017/0291678 A1    Oct. 12, 2017

(51) Int. Cl.
*B64C 1/10* (2006.01)
*B64C 1/06* (2006.01)

(52) U.S. Cl.
CPC ............... *B64C 1/10* (2013.01); *B64C 1/069* (2013.01)

(58) Field of Classification Search
CPC ............ B64C 1/10; B64C 1/069; B64C 1/061
See application file for complete search history.

(56) References Cited

U.S. PATENT DOCUMENTS

| | | | |
|---|---|---|---|
| 5,899,412 A | 5/1999 | DiIorio et al. | |
| 6,213,426 B1 * | 4/2001 | Weber | B64C 1/10 |
| | | | 244/117 R |
| 8,596,578 B2 | 12/2013 | Noebel et al. | |
| 8,777,160 B2 * | 7/2014 | Dazet | B64C 1/10 |
| | | | 244/117 R |
| 9,102,106 B2 * | 8/2015 | Dazet | B64C 1/10 |
| 2010/0230539 A1 | 9/2010 | Mischereit et al. | |
| 2011/0179626 A1 | 7/2011 | Weber et al. | |
| 2011/0290940 A1 | 12/2011 | Noebel et al. | |

FOREIGN PATENT DOCUMENTS

| | | | | |
|---|---|---|---|---|
| CA | 2703188 A1 * | 5/2009 | ............... | B64C 1/10 |
| FR | 2906524 A1 * | 4/2008 | ............... | B64C 1/10 |
| FR | 2945027 A1 * | 11/2010 | ............... | B64C 1/10 |

OTHER PUBLICATIONS

European Patent Office, "Extended European Search Report," issued in connection with European Patent Application No. 17163535.2, dated Jun. 23, 2017, 7 pages.

* cited by examiner

*Primary Examiner* — Richard R Green
(74) *Attorney, Agent, or Firm* — Hanley, Flight & Zimmerman, LLC

(57) ABSTRACT

Pressure bulkhead apparatus is disclosed. An example bulkhead apparatus includes a frame and a plurality of beams radially spaced relative to a longitudinal axis of the frame. A beam from the plurality of beams has a first end and a second end. A beam end assembly couples the second end of the beam and a stringer of a fuselage. The beam end assembly enables the second end of the beam to move relative to at least one of the frame or the stringer.

22 Claims, 6 Drawing Sheets

PRESSURE BULKHEAD APPARATUS

FIELD OF THE DISCLOSURE

This patent relates generally to aircraft and, more particularly, to pressure bulkhead apparatus.

BACKGROUND

Commercial aircraft maintain a pressure inside a cabin of a fuselage within a desired range. A fuselage of commercial aircraft typically includes fuselage portions or sections that are individually assembled and then combined or attached to form the cabin. An aft pressure bulkhead and a forward pressure bulkhead are installed to form a barrier between an internal pressurized area (e.g., a cabin, a cockpit, etc.) and an external, unpressurized area.

SUMMARY

An example bulkhead apparatus includes a frame and a plurality of beams radially spaced relative to a longitudinal axis of the frame. A beam from the plurality of beams has a first end and a second end. A beam end assembly couples the second end of the beam and a stringer of a fuselage. The beam end assembly enables the second end of the beam to move relative to at least one of the frame or the stringer.

In another example, an example aircraft includes a fuselage having stringers aligned along a length of the fuselage and a bulkhead coupled to the fuselage. The bulkhead has a web and beams. The beams are radially spaced relative to a longitudinal axis of the web. Each beam includes a first end and an opposing second end. The first end is radially inward adjacent a center of the web. The second end is radially outward adjacent a circumference of the web. A respective beam end assembly pivotally couples the second end of each beam and a respective one of the stringers. The beam end assemblies are configured to eliminate moment loading at an interface between the beams and the stringers.

Another example bulkhead apparatus includes a beam having a first end and a second end opposite the first end. The first end is coupled to the hub. The second end is radially outward relative to a frame. A first fitting is coupled to the second end of the beam. A second fitting has a first portion and a second portion. The first portion is coupled to the frame and the second portion is to couple to a stringer of a fuselage. A linkage assembly is pivotally coupled to at least one of the first fitting or second fitting.

Figure 1:
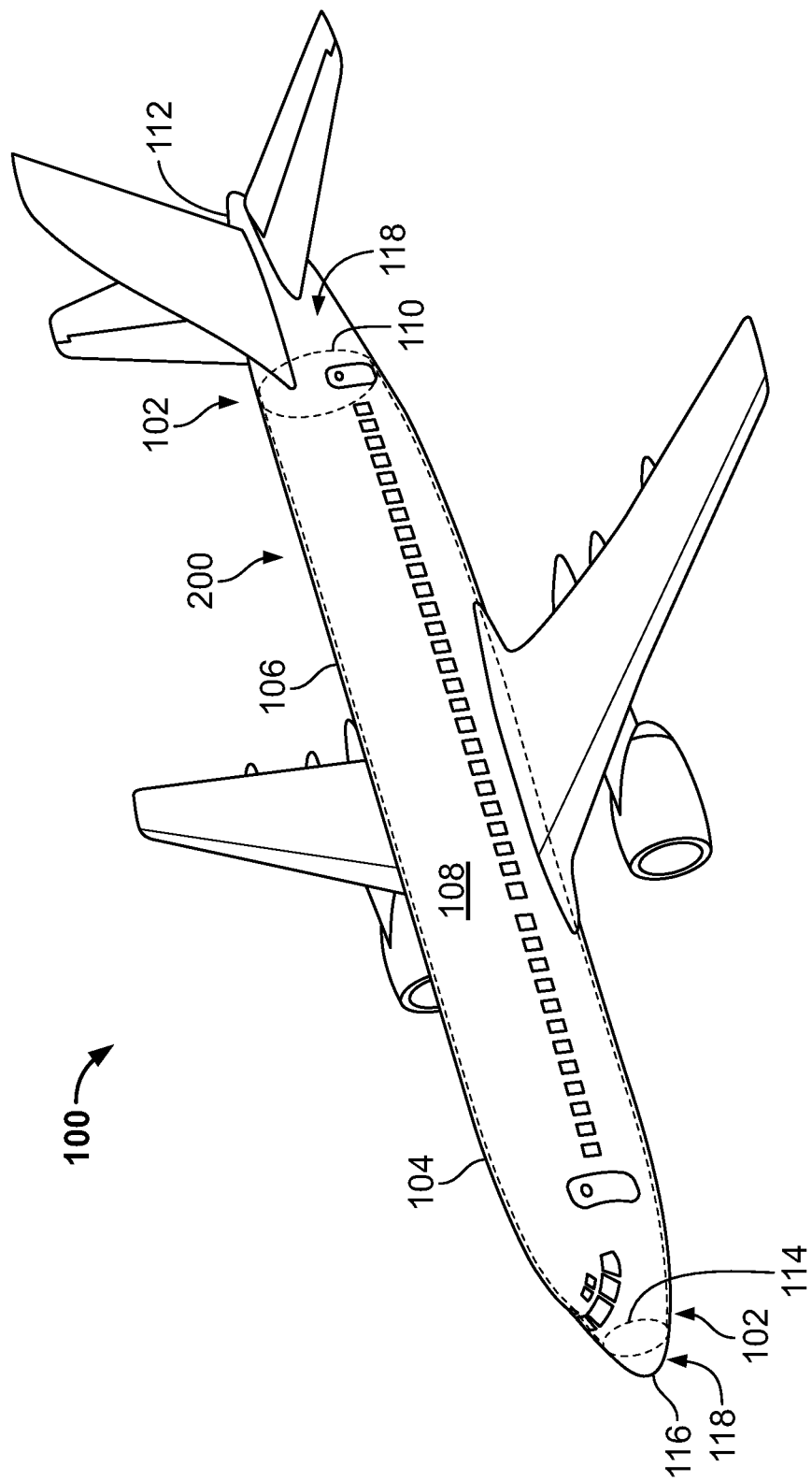
FIG. 1 depicts an example aircraft having an example pressure bulkhead apparatus constructed in accordance with the teachings disclosed herein.

Wherever possible, the same reference numbers will be used throughout the drawing(s) and accompanying written description to refer to the same or like parts. As used in this description, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts. As used herein, substantially and approximately mean within about 10% (e.g., 10 degrees) different than the number at issue. For example, substantially perpendicular means 90 degrees plus or minus 10%. For example, approximately 90 degrees means 90 degrees plus or minus 10% (e.g., between about 81 degrees and 99 degrees). In some examples, substantially parallel means 0 degrees plus or minus 10 degrees.

DETAILED DESCRIPTION

Commercial aircraft employ pressure bulkheads to form a pressurized cabin of a fuselage. Additionally, pressure bulkheads transfer and/or discharge loads (e.g., forces) to the surrounding structure of the fuselage, for example, stringers, fuselage skin and/or other frame members. Some known pressure bulkheads have a dome profile that arches toward the aft end of the fuselage. The dome profile reduces internal stresses in the pressure bulkhead. However, the dome profile occupies a relatively large volume in a fuselage, which increases the space required for the pressure bulkhead.

Some pressure bulkheads have a flat profile to enable the bulkhead to occupy significantly less space than domed pressure bulkheads. Some flat pressure bulkheads have a circular profile and include beams positioned in a grid pattern (e.g., a horizontal and vertical beam grid pattern). However, such known flat bulkheads are typically coupled to a fuselage between adjacent stringers using a relatively large fitting and link assembly to transfer end loads from the pressure bulkhead to the stringers and skin of the fuselage.

When formed in a grid pattern, the beams of flat pressure bulkheads may not couple directly to fuselage stringers of an aircraft due to tolerances and/or additional loading on the stringers (e.g., as the fuselage expands and contracts due to pressure differentials). Thus, for some flat bulkhead apparatus, relatively heavy and/or large fittings may be required to transfer force loads from the beams to the stringers and skin of the aircraft. Some bulkheads may employ radially spaced beams instead of beams provided in the grid pattern. However, in some such examples, each of the radially spaced beams may be fixed to a respective stringer of the fuselage. The fixed coupling between the beams and the stringers may impart a large moment load (e.g., bending moments) to the stringer and/or skin of the aircraft. As a result, a connection or fitting between each beam and a respective stringer is relatively large. Such connections can add weight and complexity to the aircraft, which may reduce aircraft efficiency and result in increased fuel burn.

Pressure bulkhead apparatus disclosed herein may significantly reduce manufacturing complexity, number of components, aircraft weight, and/or costs. More specifically, the example pressure bulkhead apparatus disclosed herein employ a beam end assembly to enable direct attachment between the example pressure bulkhead apparatus disclosed herein and a support structure (e.g., a stringer, and aft stringer, a former, a frame, etc.) of an aircraft, spaceship, and/or any other vehicle (e.g., a boat). More specifically, the beam end assembly disclosed herein directs or transfers tensile forces or loads to the support structure (e.g., of an aircraft), and can prevent or reduce transfer of moment loads (e.g., bending moments) to the support structure by enabling a rotational freedom between the beam end assembly and fuselage. As used herein, preventing transfer of moment loads includes absolute zero transfer of moment loads or transfer of insignificant moment loads. In some examples, insignificant moment loads means that the loads do not affect design aspects or characteristics (e.g., size, weight, material selection, etc.) of the beams, the beam end assembly and, more generally, the example pressure bulkhead apparatus disclosed herein. In other words, the pressure bulkhead apparatus disclosed herein may be designed without consideration for these insignificant moment loads. In some examples, a reduced transfer of moment loads means moment loads that are approximately less than 15% (fifteen percent) of moment loads that would otherwise be transferred if the beams of the pressure bulkhead apparatus were fixed to the fuselage (i.e., the beam end assembly did not allow for any rotational freedom between the beam end assembly and the fuselage).

Unlike the known pressure bulkheads noted above, to facilitate preventing transfer of a moment load (e.g., a bending moment) to the stringer and/or skin of the fuselage coupled to the pressure bulkhead, the beam end assembly of the example pressure bulkhead apparatus disclosed herein provides a linkage assembly (e.g., a link and pins) to enable a rotational freedom between the beam end assembly and fuselage. However, the beam end assembly may prevent translational movement of the beam and/or bulkhead apparatus relative to the support structure to enable tensile loads from the bulkhead apparatus to transfer to the support structure of the aircraft (e.g., stingers and/or fuselage skin). A beam end assembly and/or a linkage assembly may include a link and a pin, a bushing, a bearing, a bolt and bearing assembly, and/or any other fastener or coupling to prevent or reduce transfer of moment loads from the pressure bulkhead apparatus to the stringers and skin of an aircraft.

In some examples, a pressure bulkhead apparatus disclosed herein employs beams radially oriented relative to a longitudinal axis of the fuselage of the example pressure bulkhead apparatus. In particular, the beams are radially oriented along a primary load path of the web and/or the bulkhead apparatus. In this manner, the loads (e.g., pressure loads and/or non-pressure loads) imparted to the web are transferred or aligned relative to the respective beams. Each radially outward end of the beams is coupled to a respective stringer of a fuselage using an additional structure (e.g., a fittings, angles, etc.) that transfers the loads (e.g., tensile, moment, shear loads) from the beams to the stringers and the skin.

However, unlike known pressure bulkheads having radially spaced beams, the outer ends of the beams of the example pressure bulkhead apparatus disclosed herein are configured (e.g., via a beam end assembly) to move or rotate such that a moment load is not transferred to the stringers and skin of the fuselage. Additionally, the fitting of the example pressure bulkheads disclosed herein can be directly attached to a stringer of the fuselage, not between adjacent stringers as noted above. In this manner, the beam end assembly of the bulkhead apparatus may direct loads from a primary load path of an aircraft directly to stringers aligned with the respective beams, which may prevent or reduce moment loads from transferring to the respective stringers and/or the fuselage structure (e.g., frames, skin, formers, etc.) adjacent the ends of the beams.

FIG. 1 illustrates an aircraft 100 implemented with a pressure bulkhead apparatus 102 constructed in accordance with the teachings of this disclosure. The example aircraft 100 of FIG. 1 includes a fuselage 104 having a cabin 106 defining an internal pressure region 108 between an aft pressure bulkhead 110 coupled to the fuselage 104 at aft end 112 (e.g., adjacent a tail) of the aircraft 100 and a forward pressure bulkhead 114 coupled to the fuselage 104 at a forward end 116 (e.g., adjacent a nose) of the aircraft 100. The aft pressure bulkhead 110 and the forward pressure bulkhead 114 form pressure barriers between the internal pressure region 108 and an external pressure region 118. The pressure bulkhead apparatus 102 disclosed herein may be used to implement the aft pressure bulkhead 110 and/or the forward pressure bulkhead 114.

Figure 2:
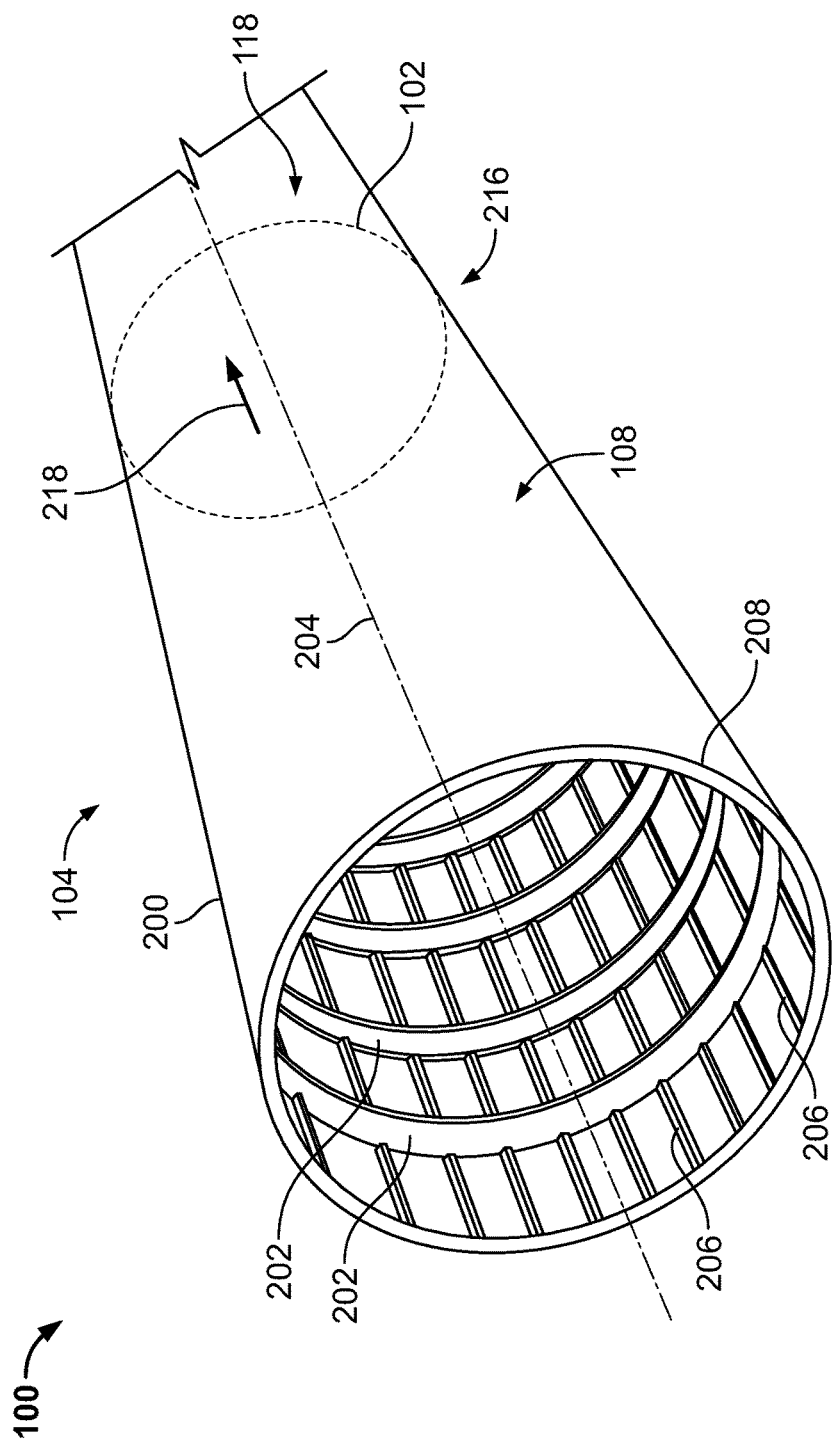
FIG. 2 is a partial view of a fuselage portion of the example aircraft of FIG. 1.

FIG. 2 is a perspective view of a fuselage portion 200 of the fuselage 104 of the aircraft 100 of FIG. 1. The fuselage portion 200 of the illustrated example includes a plurality of frames 202 (e.g., formers) that define a cross-sectional shape of the fuselage 104. In the illustrated example, the fuselage portion 200 defines a longitudinal axis 204, which is perpendicular relative to a cross-section of the fuselage portion 200. Stringers 206 of the illustrated example span a length of the fuselage portion 200 between the frames 202. An outer skin 208 of the fuselage 104 is coupled to the stringers 206 of the fuselage 104.

During flight, atmospheric pressure decreases as flight altitude increases. In some examples, cabin pressure is at a pressure equivalent to a pressure at 6000 to 8000 feet above sea level, and atmospheric pressure is at a lower pressure. Thus, during cruise, a pressure differential is maintained across the pressure bulkhead apparatus 102. As a result of a pressure differential across the pressure bulkhead apparatus 102 between the internal pressure region 108 and the external pressure region 118, pressure loads are imparted to the pressure bulkhead apparatus 102 in a direction 218 of the external pressure region 118. Additionally, operational loads (e.g., lift loads, drag loads, engine thrust loads, etc.) may be experienced during flight and/or when the aircraft 100 is on the ground and may be imparted to the pressure bulkhead apparatus 102.

The stringers 206 and/or the skin 208 are arranged to provide structural stability and integrity to the fuselage 104 by resisting the pressure loads and/or the operational loads. In other words, at least a portion of pressure loads and/or the operational loads (e.g., from wings and empennage, from discrete masses such as the engine, etc.) may be imparted to, or absorbed by, the stringers 206 and/or the skin 208. Additionally, the forces imparted to the pressure bulkhead apparatus 102 may cause or generate moment loads (e.g., bending moments) at an interface 216 between the pressure bulkhead apparatus 102 and the fuselage 104. As described in greater detail below, the pressure bulkhead apparatus 102 of the illustrated example transfers forces imparted to the pressure bulkhead apparatus 102 to the stringers 206 and/or the skin 208. Additionally, the pressure bulkhead apparatus 102 of the illustrated example may eliminate moment loads at the interface 216 between the pressure bulkhead apparatus 102 and the fuselage 104.

Figure 3:
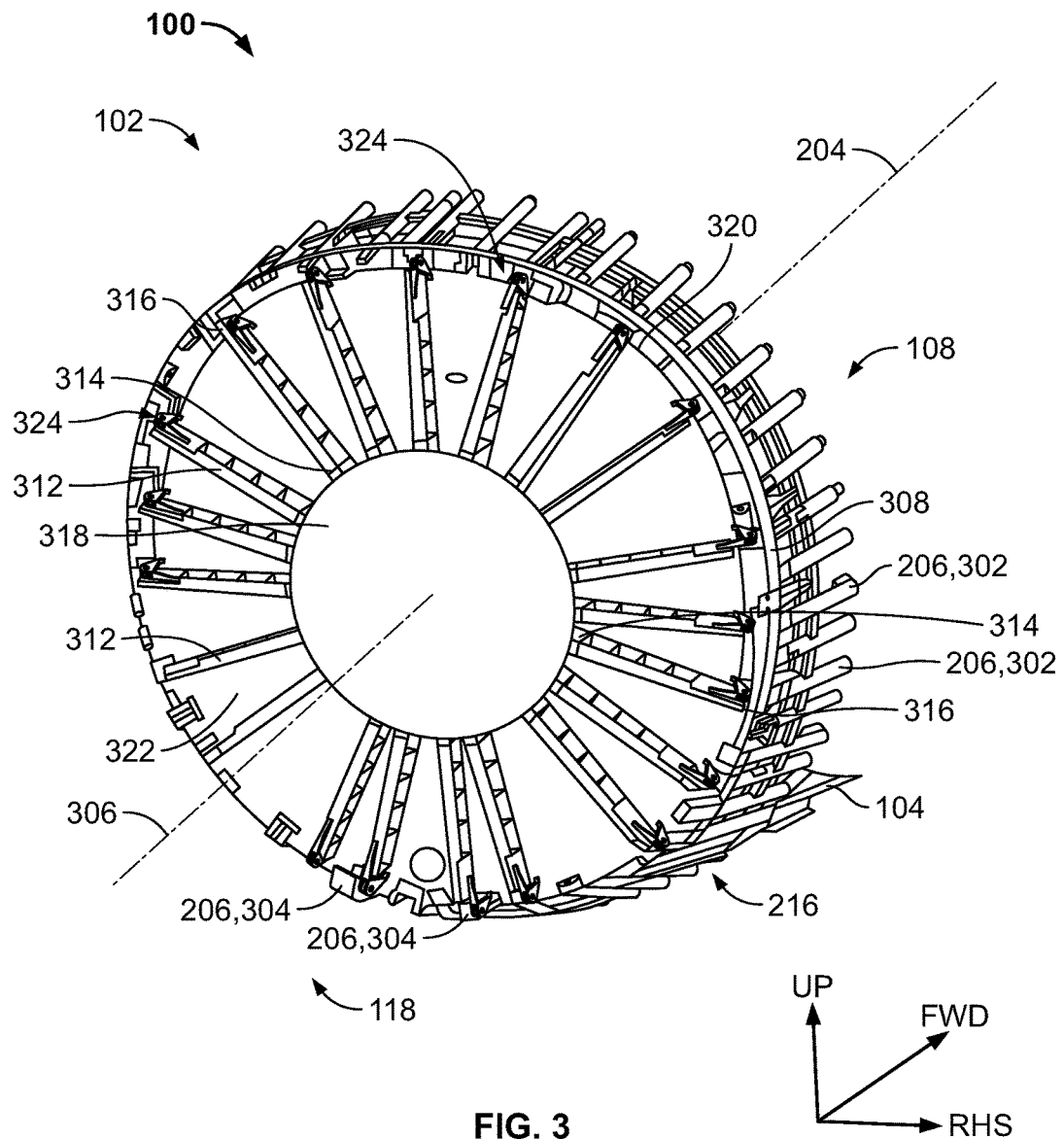
FIG. 3 is a perspective view of the example pressure bulkhead apparatus of FIGS. 1-2.

FIG. 3 is a perspective view of the pressure bulkhead apparatus 102 of FIGS. 1 and 2. The pressure bulkhead apparatus 102 of the illustrated example may implement the aft pressure bulkhead 110 and/or the forward pressure bulkhead 114 of FIG. 1. The pressure bulkhead apparatus 102 of the illustrated example couples to a frame of the fuselage 104 (e.g., stringers, formers, frames, e.g., the frames 202 of FIG. 2)). Additionally, the pressure bulkhead apparatus 102 of the illustrated example couples to forward stringers 302 (e.g., the stringers 206 positioned in the internal pressure region 108) and aft stringers 304 (e.g., the stringers 206 positioned in the external pressure region 118). When the pressure bulkhead apparatus 102 is coupled to the fuselage 104, a longitudinal axis 306 (e.g., a central axis) of the pressure bulkhead apparatus 102 aligns (e.g., coaxially aligns) with the longitudinal axis 204 of the fuselage 104. Portions of the aft stringers 304 and the skin 208 are omitted from FIG. 3 for clarity.

The pressure bulkhead apparatus 102 of the illustrated example couples to a frame 308 (e.g., a chord, a ring, an annular plate, the frame 202, etc.) having a radius. The radius of the frame 308 of the illustrated example is similar to a radius of the fuselage 104. The frame 308 of the illustrated example includes a plurality of beams 312 (e.g., 20 beams) radially spaced relative to a longitudinal axis 306 of the pressure bulkhead apparatus 102. In some examples, the beams 312 are radially spaced at equidistant angles or intervals. In some examples, the beams 312 are radially spaced at different or varying distances, angles or intervals relative to the longitudinal axis 306. Each of the beams 312 has a first end 314 adjacent the longitudinal axis 306 and a second end 316 adjacent the frame 308. To support the respective first ends 314 of the beams 312, the pressure bulkhead apparatus 102 includes a hub assembly 318 coaxially aligned with the longitudinal axis 306. The first ends 314 of the beams 312 are coupled to the hub assembly 318. The respective second ends 316 of the beams 312 project from the hub assembly 318 toward the frame 308.

The pressure bulkhead apparatus 102 includes a web 320 coupled to the beams 312. In particular, the web 320 of the illustrated example is a substantially planar skin (e.g., a sheet-shaped member) that is concentrically aligned with the hub assembly 318. Further, the beams 312 of the illustrated example are positioned against the web 320. Additionally, the beams 312 of the illustrated example are each aligned relative to a radius of the web 320. The respective first ends 314 of the beams 312 are radially inward of the hub assembly 318 and the respective second ends 316 of the beams 312 are radially outward relative to a circumference of the web 320. The web 320 of the illustrated example carries pressure loads and/or other non-pressure loads exerted on the pressure bulkhead apparatus 102 (e.g., due to a pressure differential across the pressure bulkhead apparatus 102).

To couple the frame 308 to the fuselage 104, each of the beams 312 of the pressure bulkhead apparatus 102 of the illustrated example includes a beam end assembly 324. As described in greater detail below, the beam end assembly 324 directly couples the beams 312 to respective aft stringers 304. Additionally, to eliminate moment loads at the interface 216, the beam end assembly 324 permits rotation of the respective beams 312 relative the aft stringers 304. The beam end assembly 324 prevents translational motion of the beams 312 relative to the aft stringers 304 (e.g., in the aft-fore direction along the longitudinal axis 204 of the fuselage). In operation, when a pressure differential is experienced across the pressure bulkhead apparatus 102, the web 320 transfers loads to the stringers 206 (e.g., the aft stringers 304 and/or forward stringers 302) via the beams 312 and the beam end assembly 324 of each of the beams 312.

Figure 4:
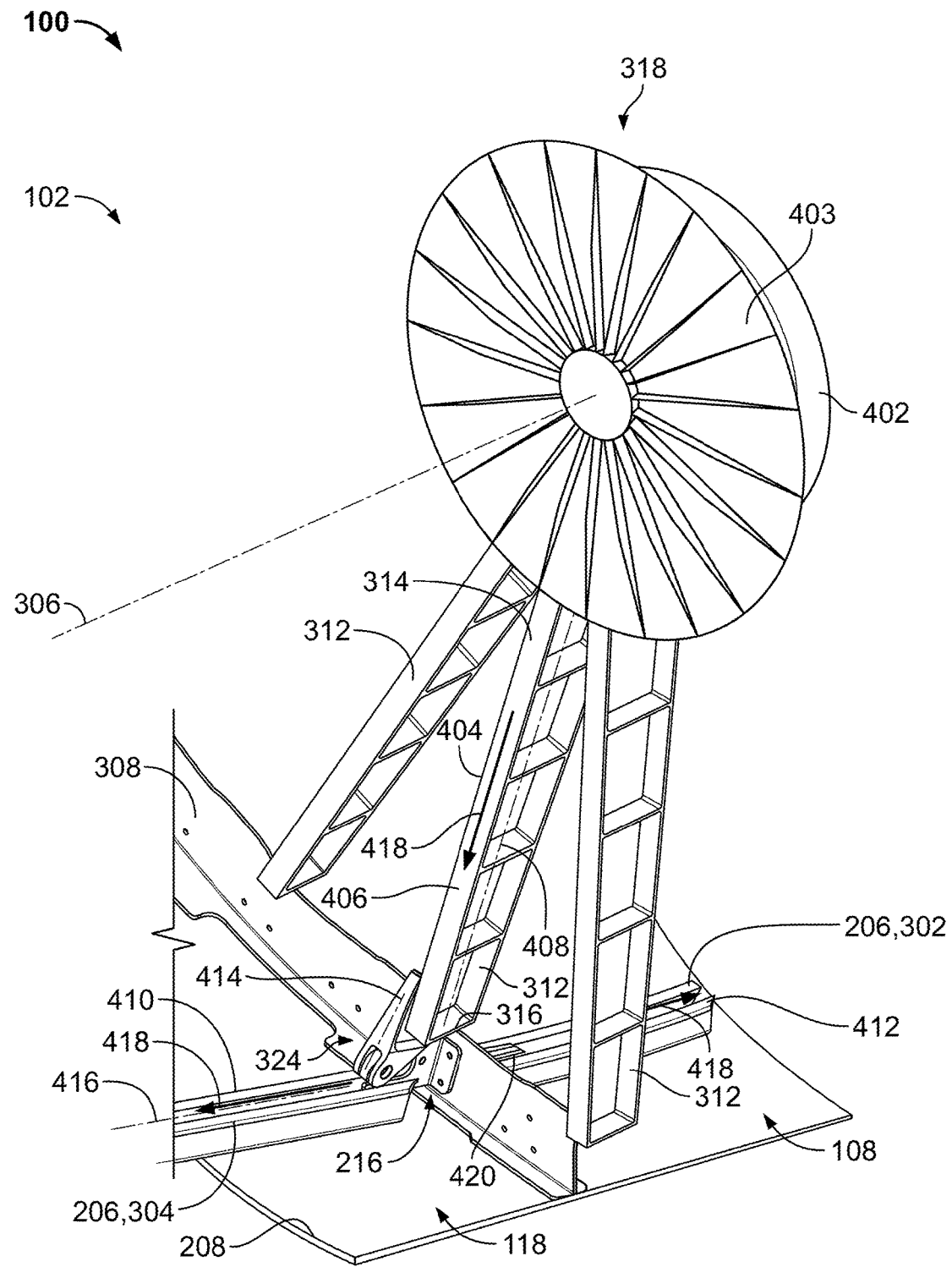
FIG. 4 is a partial, perspective view of the example pressure bulkhead apparatus of FIGS. 1-3.

FIG. 4 is an enlarged, partial view of the pressure bulkhead apparatus 102 of FIGS. 1-3. The frame 308 of the pressure bulkhead apparatus 102 is partially shown and the web 320 is omitted in FIG. 4 for clarity. As shown in FIG. 4, a beam 404 of the plurality of beams 312 includes a body 406 having a longitudinal axis 408 between the first end 314 of the beam 404 and the second end 316 of the beam 404 opposite the first end 314. The hub assembly 318 of the illustrated example includes a hub 402 and a center cap 403. The first end 314 of the beam 404 is coupled to the hub 402. In some examples, the hub 402 may include an annular channel or slot to receive the first ends 314 of the beams 312. The beams 312 may be positioned against a surface 322 (FIG. 3) of the web 320. The second end 316 of the beam 404 projects from the hub 402 in a direction toward the frame 308.

The second end 316 of the beam 404 is coupled to the frame 308 via the beam end assembly 324. In particular, the beam 404 is substantially coplanar with an aft stringer 410 of the plurality of aft stringers 304 and/or a forward stringer 412 of the plurality of forward stringers 302. Thus, the beam end assembly 324 of the illustrated example couples the second end 316 of the beam 404 to the aft stringer 410 that is adjacent to the beam 404. In this manner, when the beam 404 is coupled to the aft stringer 410, the longitudinal axis 408 of the beam 404, a longitudinal axis 414 of the beam end assembly 324, and a longitudinal axis 416 of the aft stringer 410 are substantially coplanar. In some instances, a plane taken along the longitudinal axis 408 of the beam 404 and/or the longitudinal axis 414 of the beam end assembly 324 bifurcates the longitudinal axis 416 of the aft stringer 410. The beam end assembly 324 directs loads 418 from the pressure bulkhead apparatus 102 and/or the beam 404 along a length of the aft stringer 410, the forward stringer 412, and the skin 208 in a fore-aft direction (e.g., a tension load). Additionally, the frame 308 is coupled to the forward stringer 412 via a brace or bracket 420 (e.g., an angled bracket). The loads 418 may be transferred to the forward stringer 412 via the bracket 420 and the beam end assembly 324.

Figure 5:
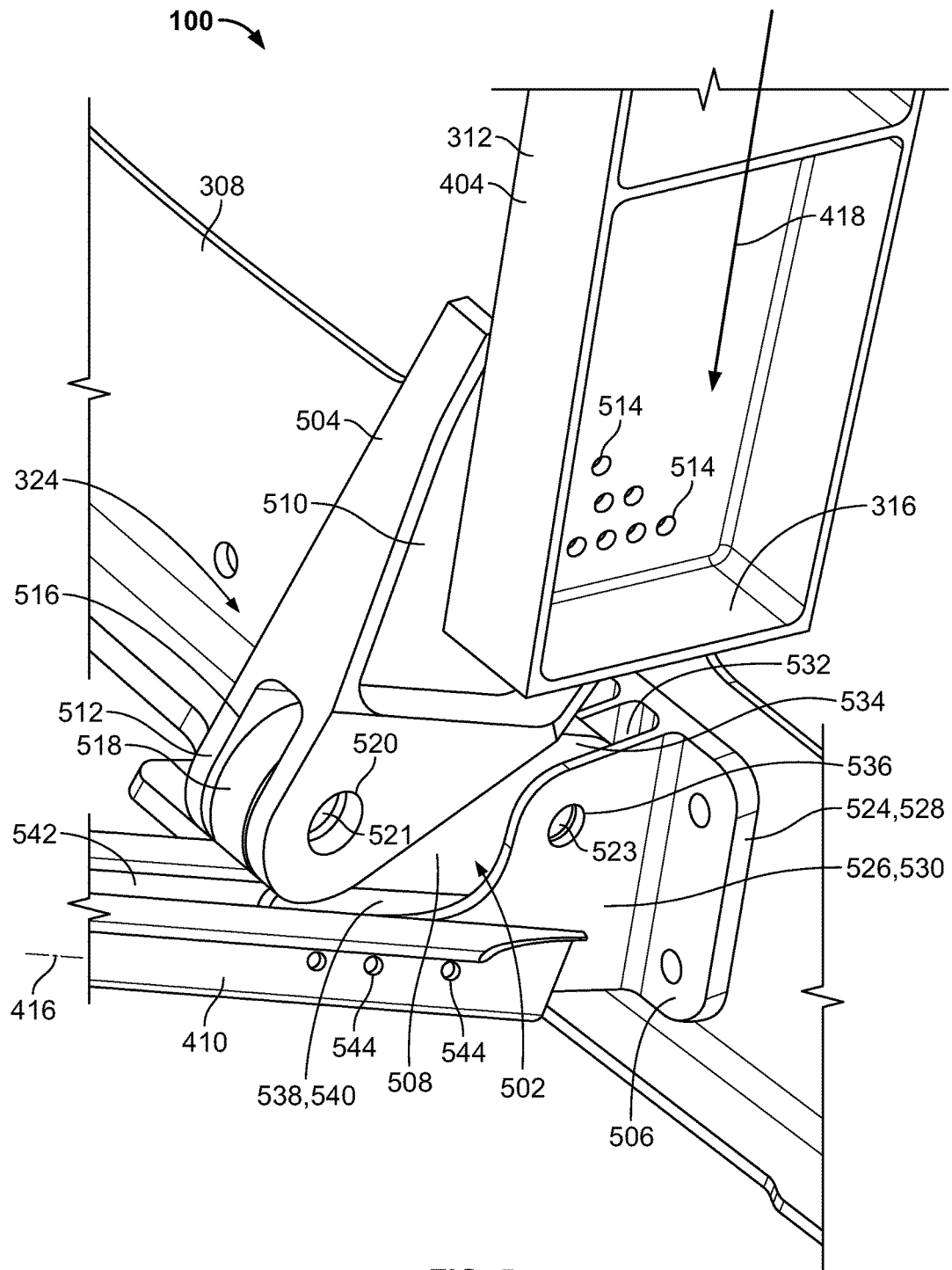
FIG. 5 is a partial, enlarged view of the example pressure bulkhead apparatus of FIGS. 1-4.

FIG. 5 is a partial, enlarged view of the example bulkhead apparatus 102 of FIGS. 1-4. The beam end assembly 324 of the illustrated example includes a first fitting 504 (e.g., a beam end fitting) and a second fitting 506 (e.g., an aft end fitting) that are coupled via a linkage assembly 502. More specifically, the linkage assembly 502 is pivotally coupled to at least one of the first fitting 504 or the second fitting 506. The linkage assembly 502 of the illustrated example includes a link 508, a first pin and bearing assembly 602 (FIG. 6) (e.g., a fastener and bearing assembly, a bolt and spherical bearing assembly, a bushing, etc.), and a second pin and bearing assembly 604 (FIG. 6) (e.g., a fastener and bearing assembly, a bolt and spherical bearing assembly, a bushing, etc.). The first pin and bearing assembly 602 and the second pin and bearing assembly 604 are not shown in FIG. 5 for clarity. The link 508 of the illustrated example includes a first opening 521 adjacent a first end 518 and a second opening 523 adjacent a second end 534.

The first fitting 504 of the illustrated example is coupled (e.g., fixed) to the second end 316 of the beam 404. The first fitting 504 of the illustrated example includes a body 510 and a clevis 512 coupled to the body 510. The first fitting 504 couples to the second end 316 of the beam 404 via, for example, fasteners 514 (e.g., bolts, screws, rivets, etc.). The clevis 512 defines a slot 516 to receive the first end 518 of the link 508 and an opening 520. The opening 520 aligns (e.g., coaxially aligns) with the opening 521 of the first end 518 of the link 508 to receive the first pin and bearing assembly 602 (FIG. 6) to pivotally couple the first end 518 of the link 508 and the clevis 512 of the first fitting 504.

The second fitting 506 of the illustrated example is coupled (e.g., fixed) to the frame 308. Additionally, the second fitting 506 of the illustrated example is coupled (e.g., fixed) to the aft stringer 410. The second fitting 506 of the illustrated example includes a first portion 524 and a second portion 526. The first portion 524 of the illustrated example is a flange 528 and the second portion 526 is a clevis 530. The clevis 530 defines a slot 532 to receive the second end 534 of the link 508 and an opening 536. The opening 536 of the clevis 530 aligns (e.g., coaxially aligns) with the opening 523 of the link 508 to receive the second pin and bearing assembly 604 (FIG. 6) to pivotally couple the second end 534 of the link 508 and the second fitting 506.

The second fitting 506 of the illustrated example also includes a third portion 538 defining an arm 540 to couple the second fitting 506 to the aft stringer 410. More specifically, the arm 540 of the illustrated example protrudes from the clevis 530 of the second fitting 506 to enable at least a portion of the arm 540 to be positioned within a receiving channel 542 of the aft stringer 410. The arm 540 of the second fitting 506 of the illustrated example is coupled to the aft stringer 410 via fasteners (e.g., bolts, screws, rivets, etc.) through openings 544 of the aft stringer 410. Thus, in the illustrated example, the first fitting 504 is fixed to the second end 316 of the beam 404, the second fitting 506 is fixed to the aft stringer 410 via the arm 540 and the frame 308 via the flange 528, and the link 508 is pivotally coupled to the first fitting 504 and the second fitting 506.

Figure 6:
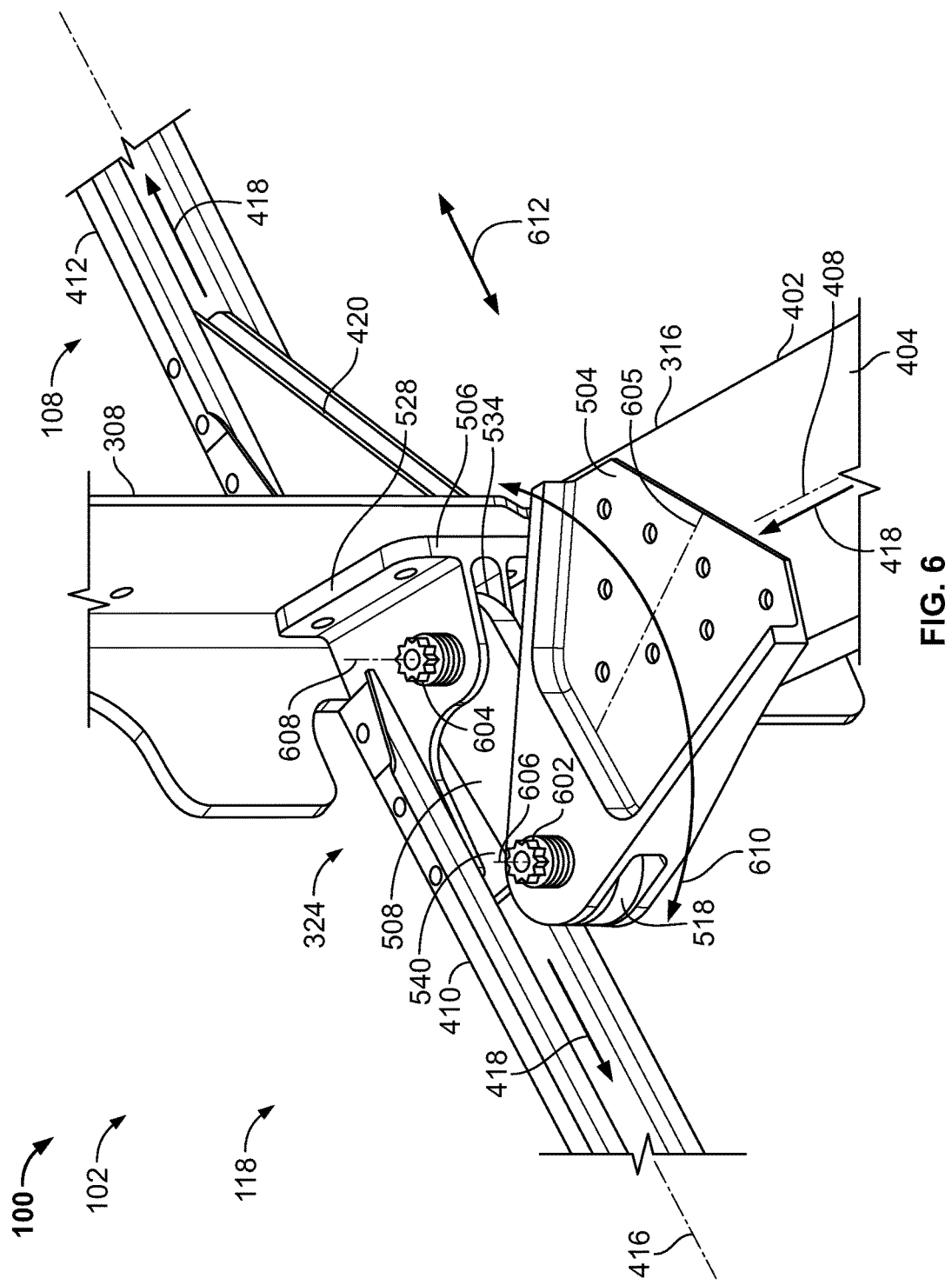
FIG. 6 is another partial, enlarged view of the example pressure bulkhead apparatus of FIGS. 1-5.

FIG. 6 is another enlarged, partial view of the example pressure bulkhead apparatus 102 of FIGS. 1-5. When assembled, the first fitting 504, the second fitting 506, and link 508 transfer the loads 418 from the beam 404 to the aft stringer 410 in a direction along a longitudinal length (e.g., along the longitudinal axis 416) of the aft stringer 410 (e.g., a fore-aft direction 612). In some examples, the longitudinal axis 408 of the beam 404 and the longitudinal axis 416 of the aft stringer 410 are coplanar. In some examples, a longitudinal axis 605 of the first fitting 504 is aligned with (e.g., in substantially the same plane as) the longitudinal axis 408 of the aft stringer 410. In some examples, the first fitting 504 may be integrally formed with the second end 316 of the beam 404 and/or may be coupled to the second end 316 of the beam 404 (e.g., via a clevis connection) such that the longitudinal axis 605 of the first fitting 504 is aligned with (e.g., in substantially the same plane as) the longitudinal axis 408 of the beam 404. In the illustrated example, the frame 308 and the beams 312 are fixed relative to the aft stringer 410 and/or the forward stringer 412 (i.e., the fuselage 104) in the fore-aft direction 612. In other words, the beam 404 cannot translate or rotate relative to the frame 308 and/or the stringers 206. However, the beam end assembly 324 (e.g., via the link 508 and the first and second pin and the bearing assemblies 602 and 604 in the respective openings 521 and 523 of the link 508) may prevent a potential moment load 610 between the second end 316 of the beam 404 and the aft stringer 410 and/or the forward stringer 412.

During flight, a pressure differential across the pressure bulkhead apparatus 102 between the external pressure region 118 and the internal pressure region 108 and/or other loads (e.g., contraction and expansion loads) will cause the beam 404 to deflect (e.g., at a center or middle portion of the beam 404). The first fitting 504 (e.g., the beam end fitting) pivots about a pivot axis 606, and the second end 534 of the link 508 pivots about a pivot axis 608 and thereby prevents the transfer of the potential moment load 610 to the aft stringer 410, the forward stringer 412 and the frame 308. However, the beam end assembly 324 provides a load path for tension loads from the first fitting 504 to the second fitting 506. The beams 312, the beam end assembly 324 (e.g., the first fitting 504, the second fitting 506, the link 508, the first and second pin and bearing assemblies 602 and 604, etc.), the web 320, and/or the frame 308 of the bulkhead apparatus 102 of the illustrated example may be composed of steel, aluminum, titanium, carbon reinforced composite material(s), alloy(s), any combination thereof, and/or any other material(s).

From the foregoing, it will be appreciated that the bulkhead apparatus 102 of the illustrated example may employ beams positioned or oriented in a grid-pattern or orientation. For example, a first plurality of beams may be positioned in a horizontal orientation relative to a longitudinal axis of the bulkhead apparatus and a second plurality of beams may be positioned in a vertical orientation. In some such examples, the beam end assembly 324 may be employed to directly couple the beams of a bulkhead apparatus in a grid-pattern (e.g., the first and second plurality of beams) directly to respective stringers 208 of the fuselage 104 in substantially the same manner as disclosed herein. The example bulkhead apparatus disclosed herein simplifies manufacturing by reducing the number of components (e.g., by approximately half) needed to couple known bulkhead apparatus to a fuselage of an aircraft.

At least some of the aforementioned examples include one or more features and/or benefits including, but not limited to, the following:

In some examples, a pressure bulkhead apparatus includes a frame and a plurality of beams radially spaced relative to a longitudinal axis of the frame. A beam from the plurality of beams has a first end and a second end. In some such examples, a beam end assembly couples the second end of the beam and a stringer of a fuselage. In some examples, the beam end assembly enables the second end of the beam to move relative to at least one of the frame or the stringer.

In some examples, the beam end assembly enables the second end of the beam to rotate relative to the at least one of the frame or the stringer.

In some examples, the beam end assembly includes a first fitting, a second fitting and a linkage assembly.

In some examples, the first fitting is coupled to the second end of the beam.

In some examples, the second fitting is coupled to the stringer.

In some examples the linkage assembly is pivotally coupled to the first fitting and the second fitting.

In some examples, the linkage assembly includes a link, a first pin and bearing assembly, and a second pin and bearing assembly.

In some examples, the link has a first opening adjacent a first end of the link to receive the first pin and bearing assembly to pivotally couple the link and the first fitting, and the link has a second opening adjacent a second end of the link to receive the second pin and bearing assembly to pivotally couple the link and the second fitting.

In some examples, a web is coupled to the beams.

In some examples, the beam end assembly is configured to transfer a load to the stringer such that the load is aligned along a longitudinal axis of the stringer.

In some examples, a hub is coaxially aligned with the longitudinal axis of the frame, where the first end of the beam is configured to couple to the hub.

In some examples, the beam is coplanar with the stringer.

In some examples, an aircraft includes a fuselage having stringers aligned along a length of the fuselage and a bulkhead coupled to the fuselage. In some such examples, the bulkhead has a web and beams. In some such examples, the beams are radially spaced relative to a longitudinal axis of the web. In some examples, each beam includes a first end and an opposing second end. In some such examples, the first end is radially inward adjacent a center of the web and the second end is radially outward adjacent a circumference of the web. In some such examples, a respective beam end assembly pivotally couples the second end of each beam and a respective one of the stringers. In some examples, the beam end assemblies are configured to eliminate moment loading at an interface between the beams and the stringers.

In some examples, a hub is concentrically aligned relative to the web.

In some examples, the first end of each beam is coupled to the hub.

In some examples, the beam end assembly is pivotally coupled to the respective ones of the stringers.

In some examples, a bulkhead includes a hub and a beam having a first end and a second end opposite the first end. In some such examples, the first end is directly coupled to the hub and the second end is radially outward relative to a frame. In some such examples, a first fitting is coupled to the second end of the beam. In some such examples, a second fitting has a first portion and a second portion, where the first portion is coupled to the frame and the second portion is configured to couple to a stringer of a fuselage. In some such examples, a linkage assembly pivotally couples to at least one of the first fitting or second fitting.

In some examples, the second fitting includes a body defining the first portion and the second portion.

In some examples, the first portion is a flange and the second portion is a clevis.

In some examples, the second fitting includes a third portion defining an arm configured to couple to the stringer.

In some examples, the first fitting, the second fitting and the linkage assembly transfer a load to the stringer in a direction along a longitudinal length of the stringer.

In some examples, the first fitting, the second fitting and the linkage assembly eliminate a moment load between the second end of the beam and the stringer.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A bulkhead apparatus comprising:
   a frame;
   a plurality of beams radially spaced relative to a longitudinal axis of the frame;
   a hub coaxially aligned with the longitudinal axis of the frame, the hub to support respective first ends of the beams, respective second ends of the beams to project from the hub toward the frame;
   a web coupled to the beams, the web defining a substantially planar skin; and
   a beam end assembly to couple the second end of each beam to a respective stringer of a fuselage, the beam end assembly to enable the second end of each beam to move relative to at least one of the frame or the respective stringer when the bulkhead apparatus is coupled to the fuselage.

2. The apparatus of claim 1, wherein each beam end assembly is configured to enable the second end of the respective beam to rotate relative to the at least one of the frame or the respective stringer and prevent translational motion of the second end of the respective beam relative to the at least one of the frame or the respective stringer.

3. The apparatus of claim 1, wherein each beam end assembly includes a first fitting, a second fitting, and a linkage assembly.

4. The apparatus of claim 3, wherein the first fitting is coupled to the second end of the respective beam via fasteners.

5. The apparatus of claim 4, wherein the second fitting is to couple directly to the respective stringer when the bulkhead apparatus is coupled to the fuselage.

6. The apparatus of claim 3, wherein the linkage assembly is pivotally coupled to the first fitting and the second fitting.

7. The apparatus of claim 6, wherein the linkage assembly includes a link, a first pin and bearing assembly, and a second pin and bearing assembly.

8. The apparatus of claim 7, wherein the link has a first opening adjacent a first end of the link to receive the first pin and bearing assembly to pivotally couple the link and the first fitting, and the link has a second opening adjacent a second end of the link to receive the second pin and bearing assembly to pivotally couple the link and the second fitting.

9. The apparatus of claim 1, wherein each beam end assembly is configured to transfer a load to the respective stringer such that the load is aligned along a longitudinal axis of the respective stringer.

10. The apparatus of claim 1, wherein the first ends of the beams are directly attached to the hub.

11. The apparatus of claim 1, wherein each beam is coplanar with the respective stringer when the bulkhead is coupled to the fuselage.

12. The apparatus of claim 1, wherein the second fitting includes an arm to be at least partially positioned within a receiving channel of the stringer.

13. An aircraft comprising:
   a fuselage having a frame positioned between forward stringers and aft stringers, the forward and aft stringers being aligned along a length of the fuselage;
   a bulkhead coupled to the fuselage, the bulkhead being positioned between forward stringers and the aft stringers, the bulkhead having a web and beams, the beams radially spaced relative to a longitudinal axis of the web, each beam including a first end and an opposing second end, the first end being radially inward adjacent a center of the web, the second end being radially outward toward a circumference of the web adjacent the frame; and
   a respective beam end assembly to pivotally couple the second end of each beam and a respective one of the aft stringers and the frame, the beam end assemblies are configured to eliminate moment loading at an interface between the beams and the aft stringers, each beam end assembly including:
      a first fitting coupled to the second end of the beam;
      a second fitting having a first portion and a second portion protruding from the first portion, the first portion being coupled to an aft side of the frame of the bulkhead and the second portion being directly coupled to the respective aft stringer; and
      a link pivotally coupled to at least one of the first fitting or the second fitting; and
   a respective brace coupled to a respective forward stringer and a forward side of the frame.

14. The aircraft of claim 13, further comprising a hub concentrically aligned relative to the web, wherein the first end of each beam is coupled to the hub.

15. The apparatus of claim 13, wherein the second portion is at least partially positioned within a receiving channel of the respective aft stringer.

16. A bulkhead comprising:

a frame;

a hub;

a beam having a first end and a second end opposite the first end, the first end coupled to the hub, the second end being radially outward relative to the frame, the beam defining a distance between the hub and the frame;

a skin coupled to the hub and the beam, the skin having a substantially planar profile;

a first fitting coupled to the second end of the beam;

a second fitting having a first portion and a second portion, the first portion coupled to the frame and the second portion to couple to a stringer of a fuselage when the bulkhead is coupled to the fuselage; and a linkage assembly pivotally coupling the second end of the beam to at least one of the stringer or the frame via the first fitting and the second fitting.

17. The bulkhead of claim 16, wherein the second fitting includes a body defining the first portion and the second portion.

18. The bulkhead of claim 16, wherein the first portion is a flange and the second portion is a clevis.

19. The bulkhead of claim 16, wherein the second fitting includes a third portion defining an arm configured to couple to the stringer.

20. The bulkhead of claim 19, wherein the arm is to be at least partially positioned within a receiving channel of the stringer.

21. The bulkhead of claim 16, wherein the first fitting, the second fitting, and the linkage assembly transfer a load to the stringer in a direction along a longitudinal length of the stringer.

22. The bulkhead of claim 16, wherein the first fitting, the second fitting, and the linkage assembly are configured to eliminate a moment load between the second end of the beam and the stringer.

* * * * *